Figure 1:
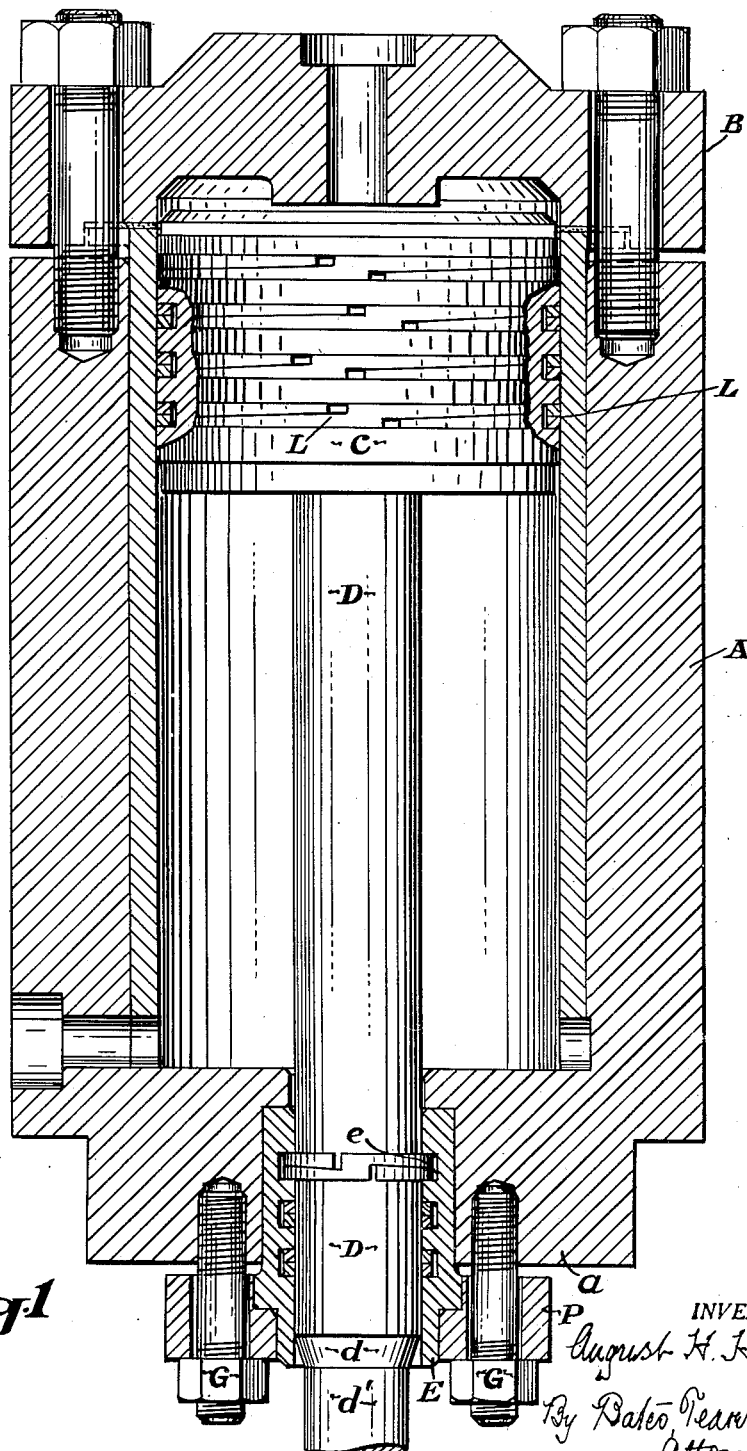

May 3, 1949.  A. H. HEINRICH  2,468,752
PISTON ROD PACKING
Filed Feb. 25, 1946  2 Sheets-Sheet 1

INVENTOR.
August H. Heinrich
By Bates, Teare & McBean
Attorneys

May 3, 1949.   A. H. HEINRICH   2,468,752
PISTON ROD PACKING

Filed Feb. 25, 1946   2 Sheets-Sheet 2

INVENTOR.
August H. Heinrich
BY
Bates, Teare & McBean,
Attorneys.

Patented May 3, 1949

2,468,752

UNITED STATES PATENT OFFICE 2,468,752

PISTON ROD PACKING

August H. Heinrich, Euclid, Ohio, assignor to Auto Diesel Piston Ring Company, Cleveland, Ohio, a corporation of Ohio Application February 25, 1946, Serial No. 649,894

5 Claims. (Cl. 286—20)

1

This invention relates to piston rod packing comprising coacting ring members formed to maintain a substantially fluid-tight connection between a piston rod and with a suitable sleeve or tubular recess through which the rod operates.

More specifically, it is an object of the invention to provide a packing comprising two split rings coacting with each other and operating automatically to exert an inward pressure on the piston rod and at the same time maintain a tight seal in an annular recess in the surrounding wall. Another feature of my invention is the provision of a two-ring automatically acting packing, whereby the rings are of identical form, thus simplifying the manufacture of the packing.

The invention is illustrated in the drawings hereof and is hereinafter more fully explained and the essential novel features are summarized in the claims.

Figure 2:
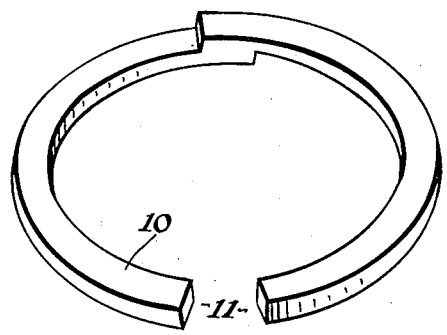
Figure 5:
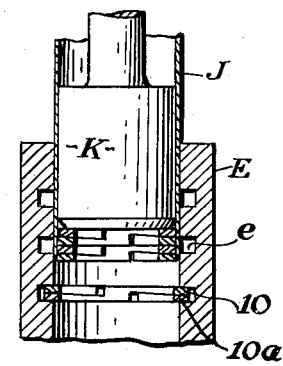
Figure 3:
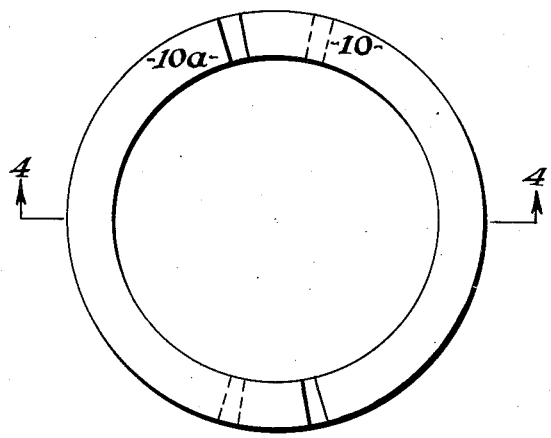
Figure 6:
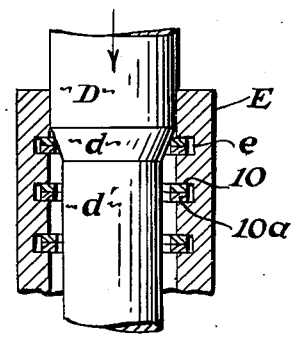
Figure 4:
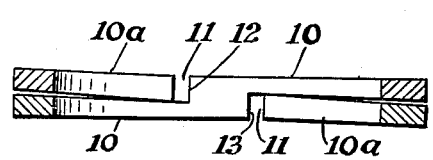

In the drawings, Fig. 1 is an axial section of a cylinder, a piston and a piston rod, with my packing embracing the piston rod; Fig. 2 is a perspective of either member of the combined packing ring; Fig. 3 is a plan of the two members of the packing interlocked with each other; Fig. 4 is a cross section of the packing on the line 4—4 on Fig. 3; Fig. 5 is a view illustrative of a device for placing the packing rings in a preliminary position in their stationary retaining grooves; Fig. 6 is a view illustrating the action of the piston rod in spreading the rings into their retaining grooves and causing them to hug the working portion of the piston rod.

In Fig. 1, A indicates a suitable cylinder having a fixed head $a$ and a removable head B. C indicates a piston having a piston rod D. E indicates a suitable sleeve mounted in the fixed head $a$ and embracing the piston rod, this sleeve being shown as held in place by a ring F drawn toward the cylinder head by bolts and nuts G. The present invention is concerned with means for retaining a tight packing between the piston rod D and the sleeve E. This packing consists of two-part ring, about to be described in detail, which is mounted in an annular groove $e$ in the sleeve E and closely hugs the piston rod D.

Referring now to Figs. 2, 3 and 4, the packing ring is composed of two identical members 10 and 10a. Each member is formed as a nearly complete annulus but with a gap 11, and the mem-

2 bers are interlocked by each member extending through the gap of the other, so that each member lies above the other in one region and below the other in the opposite region. From the gap 11 each arm of the ring member becomes gradually thinner toward the intermediate region diametrically opposite the gap. In such intermediate region each arm of the ring is offset producing an abrupt upward shoulder 12 and a correspondingly abrupt downward shoulder 13.

In other words, each ring is formed as a single integral member from one end of the gap to the other, but two arms of the ring have their top and bottom surfaces converging from the gap so that each arm is thickest adjacent the gap and thinnest adjacent the shoulder. The height of either shoulder 12 or 13 is substantially the same as the thickness of either arm at the extreme end thereof.

It results from the tapered identical formation described, that when the two rings are interlocked and placed at the piston groove the upper face of the composite ring lies in a single plane and likewise the flat lower face lies in a single plane and these two planes are parallel.

The piston ring has such normal dimensions with relation to the piston rod it is to embrace that the internal diameter of the unapplied ring is somewhat less than the external diameter of the piston rod. Likewise the external diameter of the unapplied ring is less than the extreme diameter of any of the grooves $e$ in the embracing sleeve. Accordingly, the composite ring may be placed in the groove by giving the ring a preliminary contraction and then allowing it to expand by its own resilience part way into the groove. Thereafter, by giving the ring a further expansion in the groove, its interior diameter is enlarged to receive the piston rod, which the ring thereafter hugs by its own resilience.

Explaining the action more fully, before the composite rings are mounted in the sleeve grooves each ring is slightly compressed and then allowed to expand to its normal position which carries it part way into the groove. After the rings have been placed in the groove they are expanded, preferably by a conical portion of the piston rod beyond its working portion, and the working portion of the rod slipped through the rings, in which position each ring slightly clears the extreme periphery of the groove and closely hugs the rod. The ring thus retains a close working fit on the rod by reason of its tendency to contract, and at the same time it obtains a snug fit with the upper and under walls of the groove by reason of the longitudinal expansion of the ring due to its radial expansion in the groove. It will be seen, therefore, when the ring is in place it obtains a snug fit with both the piston rod and the groove and thus makes a fluid-tight packing for the movable piston rod.

A convenient method for mounting the rings in the grooves of the sleeve E is to compress the rings radially and place them in a thin sleeve the exterior of which has a diameter about the same as that of the piston rod, then to shove said sleeve into the bore of the retaining sleeve E with its edge adjacent to one of the grooves and shove the compressed packing ring out of the positioning sleeve and allow it to move part way into the groove e by its own expansion.

Fig. 5 illustrates the device for mounting the rings in the grooves. In this view J is the positioning sleeve and K a plunger movable therein to expel the rings. As many composite rings as there are grooves to be filled are first mounted in this positioning sleeve J. Then the sleeve is put into the cylinder sleeve E with the end of the positioning sleeve clearing the endmost groove e. Then the plunger K is operated to advance the set of rings within the positioning sleeve until the endmost ring passes out of such sleeve and springs into the adjacent groove e, the ring thus coming into the position shown for the lowermost ring in Fig. 5. Now the sleeve J is further withdrawn to expose the next groove e and the packing rings are shoved downwardly to free the bottom-most ring which thereupon swings into that groove e. This operation is continued until the grooves in cylinder e are all occupied between packing rings, then the positioning sleeve J and plunger K are withdrawn.

The packing rings located in the cylinder sleeve R project inwardly by their own contraction into the bore of such sleeve. It is necessary to spread them to insert the piston rod into the rings and cause them to hug the rod tightly. This may be readily effected by forming an inclined or frusto-conical portion on the piston rod beyond its working length through the sleeve. Such frusto-conical portion is indicated at d in Figs. 1 and 6, and below that is a smaller portion d', which has a diameter less than the contracted internal diameter of the rings. Accordingly, the portion d' is readily passed through the rings and then as the enlarging portion d comes into engagement with the topmost ring it is cammed outwardly into its final position and so on successively for the different rings, which will then snugly embrace the working portion of the piston rod when the piston has been placed in the cylinder, the rod has advanced far enough to carry its full diameter portion into the rings. This is the condition shown in Fig. 1, where the installation of the packing has been completed.

In the operation of the piston and rod, the rod slides freely through each compound packing ring, as the ring is free to expand radially. At the same time the normal contraction of the ring maintains a snug fluid-tight engagement with the rod and also, maintains a fluid-tight engagement with the top and bottom walls of the stationary groove in the cylinder sleeve E.

Fig. 1 shows the piston C as provided with a number of annular grooves which are occupied by compound piston rings L. These rings are of somewhat similar formation to the rings 10 and 10a, but differ in the direction of the taper of their arms, which their relation to the grooves they occupy is the opposite of that heretofore described, so that when these rings are compressed radially into the piston grooves they expand longitudinally to make a fluid-tight engagement with the top and bottom walls of the grooves. Piston rings, so formed and acting are not claimed in this application but in the pending application 621,787, filed October 11, 1945.

I claim:

1. The combination with a piston rod and means providing an annular groove surrounding the rod and a composite packing ring occupying the groove and tending to contract about the rod, said composite ring comprising two interlocking members each nearly completely annular but having a gap, each member extending through the other at the gap so that each member lies above the other in the one region and below the other in another region, the mating surfaces of the two rings being circumferentially inclined in opposite directions.

2. A composite packing ring comprising two interlocking nearly annular members, each member having a pair of arcuate arms leading from an intermediate region having the full thickness of the composite ring to a gap between the ends of the arms substantially diametrically opposite said intermediate region, the thickest portion of each occupying the gap of the other, the arms gradually decreasing in thickness from the gap to the intermediate region.

3. A composite packing ring comprising two identical interlocking members, each member being nearly completely annular but having a gap, the intermediate portion of each member substantially diametrically opposite its gap extending through the gap of the other member, the mating surfaces on the underside of one member and the upper side of the other being inclined in opposite directions, with the arcuate arm thickest adjacent the gap and thinnest adjacent said intermediate portion.

4. A composite packing ring comprising two identical members, each nearly annular but having a gap in one region and substantially diametrically opposite the gap having upwardly and downwardly offset shoulders, each member occupying the gap of the other member, the arms of each member becoming gradually thicker from the offset shoulder to the free end of the arm, the increase in thickness taking place on that face of the member which engages the other member, whereby the composite ring has parallel top and bottom faces but inclined intermediate faces, the intermediate portion of each member where it extends through the gap of the other member having its shoulders standing opposite the end of the arm of the other member with an arcuate space of variable length between them, allowing the composite ring to be collapsed radially, the radial expansion causing the ring to expand axially.

5. A nearly annular member for a composite packing ring, said member having a gap in one region and substantially diametrically opposite the gap having upper and lower shoulders, the ring increasing in thickness gradually from each abrupt shoulder to the corresponding free end of the member, whereby each member may be interlocked with a similar member each having its shouldered portion extending through the gap of the other and the inclined surfaces of such two members being adapted to bear against each other while the external planes of the two members are parallel, and whereby the radial expansion of such contracting rings causes a longitudinal spreading thereof.

AUGUST H. HEINRICH.

REFERENCES CITED

The following references are of record in the file of this patent:

UNITED STATES PATENTS

| Number | Name | Date |
|---|---|---|
| 1,263,897 | Jaeger | Apr. 23, 1918 |
| 1,391,335 | Mathews | Sept. 20, 1921 |
| 1,395,366 | Schreiber | Nov. 1, 1921 |
| 1,728,765 | Keller | Sept. 17, 1929 |